United States Patent
Chang et al.

(10) Patent No.: US 9,794,384 B2
(45) Date of Patent: Oct. 17, 2017

(54) COMMUNICATION DEVICE

(71) Applicant: HON HAI PRECISION INDUSTRY CO., LTD., New Taipei (TW)

(72) Inventors: Hao-Ying Chang, New Taipei (TW); Ching-Sung Wang, New Taipei (TW); Pai-Cheng Huang, New Taipei (TW); Chao-Wei Ho, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/353,723

(22) Filed: Nov. 16, 2016

(65) Prior Publication Data

US 2017/0195467 A1    Jul. 6, 2017

(30) Foreign Application Priority Data

Dec. 31, 2015  (TW) .............................. 104144631 A

(51) Int. Cl.
*H04M 1/02*      (2006.01)
*H04B 7/0404*    (2017.01)

(52) U.S. Cl.
CPC ........ *H04M 1/0264* (2013.01); *H04B 7/0404* (2013.01); *H04M 1/0249* (2013.01); *H04M 1/0277* (2013.01)

(58) Field of Classification Search
CPC ............. H04M 1/0264; H04M 1/0249; H04M 1/0277; H04B 7/0404
USPC .................................................... 455/575.5
See application file for complete search history.

(56) References Cited

U.S. PATENT DOCUMENTS

| | | | | |
|---|---|---|---|---|
| 6,694,151 | B2* | 2/2004 | Carlson | H01Q 1/22 348/14.02 |
| 7,495,702 | B2* | 2/2009 | Herranen | H04M 1/0264 348/373 |
| 8,190,204 | B2* | 5/2012 | Whitney | H04M 1/253 345/1.1 |
| 8,797,376 | B2* | 8/2014 | Saleh | H04N 7/15 348/14.01 |
| 9,093,746 | B2* | 7/2015 | Ko | H01Q 1/243 |
| 9,318,806 | B2* | 4/2016 | Yarga | H01Q 5/328 |
| 9,487,998 | B1* | 11/2016 | Agudelo | E06B 9/38 |
| 9,577,318 | B2* | 2/2017 | Pascolini | G06K 9/00006 |
| 9,637,051 | B2* | 5/2017 | Dayan | B60R 1/00 |
| 2004/0108959 | A1* | 6/2004 | Park | H01Q 1/243 343/702 |
| 2005/0174468 | A1* | 8/2005 | Herranen | H04M 1/0264 348/340 |

(Continued)

*Primary Examiner* — Hai V Nguyen
(74) *Attorney, Agent, or Firm* — Steven Reiss

(57) ABSTRACT

A communication device achieving a better functional integration between multiple cameras and multiple antennas includes a housing, a circuit board received in the housing; a camera structure partially exposed through the housing, and an antenna structure. The camera structure comprises a first camera, a second camera, a first frame configured to received the first camera, and a second frame configured to received the second camera. The first camera and the second camera have a same orientation. The camera structure and the antenna structure are positioned on the circuit board. The antenna structure is positioned adjacent to and electrically connected to at least one of the first frame and the second frame.

17 Claims, 8 Drawing Sheets

(56) References Cited

U.S. PATENT DOCUMENTS

| | | | | |
|---|---|---|---|---|
| 2007/0015554 A1* | 1/2007 | Siddiqui | H01Q 1/243 | |
| | | | | 455/575.7 |
| 2008/0129644 A1* | 6/2008 | Seo | H01Q 1/243 | |
| | | | | 343/893 |
| 2008/0231521 A1* | 9/2008 | Anguera Pros | H01Q 1/243 | |
| | | | | 343/702 |
| 2008/0268925 A1* | 10/2008 | Tang | H01Q 1/2258 | |
| | | | | 455/575.7 |
| 2009/0256759 A1* | 10/2009 | Hill | H01Q 1/243 | |
| | | | | 343/702 |
| 2010/0109955 A1* | 5/2010 | Anguera | H01Q 1/243 | |
| | | | | 343/702 |
| 2012/0098720 A1* | 4/2012 | Hill | H01Q 1/243 | |
| | | | | 343/725 |
| 2012/0229349 A1* | 9/2012 | Badaruzzaman | H01Q 1/243 | |
| | | | | 343/702 |
| 2012/0299783 A1* | 11/2012 | Lee | H01Q 1/2291 | |
| | | | | 343/700 MS |
| 2013/0016267 A1* | 1/2013 | Ko | G06F 1/1637 | |
| | | | | 348/333.01 |
| 2013/0076597 A1* | 3/2013 | Becze | G06F 3/1438 | |
| | | | | 345/1.3 |
| 2013/0093640 A1* | 4/2013 | Kwon | H01Q 1/243 | |
| | | | | 343/841 |
| 2013/0176401 A1* | 7/2013 | Monari | H04N 5/2252 | |
| | | | | 348/47 |
| 2013/0267282 A1* | 10/2013 | Shin | H04M 1/18 | |
| | | | | 455/575.1 |
| 2014/0010518 A1* | 1/2014 | Takagi | H04N 5/91 | |
| | | | | 386/245 |
| 2014/0063336 A1* | 3/2014 | Choi | H04N 5/2252 | |
| | | | | 348/374 |
| 2014/0073374 A1* | 3/2014 | Jorgensen | H04M 1/0262 | |
| | | | | 455/556.1 |
| 2014/0285375 A1* | 9/2014 | Crain | G01S 13/885 | |
| | | | | 342/25 A |
| 2014/0327592 A1* | 11/2014 | Tsai | H01Q 1/243 | |
| | | | | 343/841 |
| 2014/0375506 A1* | 12/2014 | Ko | H01Q 1/243 | |
| | | | | 343/700 MS |
| 2015/0049206 A1* | 2/2015 | Eshita | H04N 5/2251 | |
| | | | | 348/207.11 |
| 2015/0053757 A1* | 2/2015 | Williams | G06K 7/10009 | |
| | | | | 235/375 |
| 2015/0077627 A1* | 3/2015 | Sutton | H01L 27/14625 | |
| | | | | 348/373 |
| 2015/0109167 A1* | 4/2015 | Yarga | H01Q 1/243 | |
| | | | | 343/700 MS |
| 2015/0228066 A1* | 8/2015 | Farb | G06K 9/00805 | |
| | | | | 348/148 |
| 2015/0350605 A1* | 12/2015 | Price | G01N 33/526 | |
| | | | | 348/77 |
| 2015/0372656 A1* | 12/2015 | Mow | H03H 7/38 | |
| | | | | 455/77 |
| 2016/0022374 A1* | 1/2016 | Haider | A61B 17/17 | |
| | | | | 606/96 |
| 2016/0063274 A1* | 3/2016 | Martin | G06F 21/6245 | |
| | | | | 726/19 |
| 2016/0138789 A1* | 5/2016 | Brown | F21S 8/026 | |
| | | | | 362/95 |
| 2016/0233271 A1* | 8/2016 | Pellizzer | H01L 27/2463 | |
| 2016/0290794 A1* | 10/2016 | Ni | G01B 11/26 | |
| 2017/0091922 A1* | 3/2017 | Siercks | G06T 7/0004 | |

* cited by examiner

COMMUNICATION DEVICE

FIELD

The present disclosure relates to a communication device.

BACKGROUND

Communication devices, such as mobile phones, usually include wireless communication structures which allow the communication devices to communicate with each other. The communication device may also comprise an antenna structure and two cameras. Using two cameras allows the communication device to obtain three-dimensional images. When the antenna structure is positioned adjacent to the cameras, a camera support frame may affect a radiation efficiency of the antenna structure. When the antenna structure is spaced away from the cameras, size of the communication device is increased.

BRIEF DESCRIPTION OF THE DRAWINGS

Implementations of the present technology will now be described, by way of example only, with reference to the attached figures, wherein.

DETAILED DESCRIPTION

Figure 1:
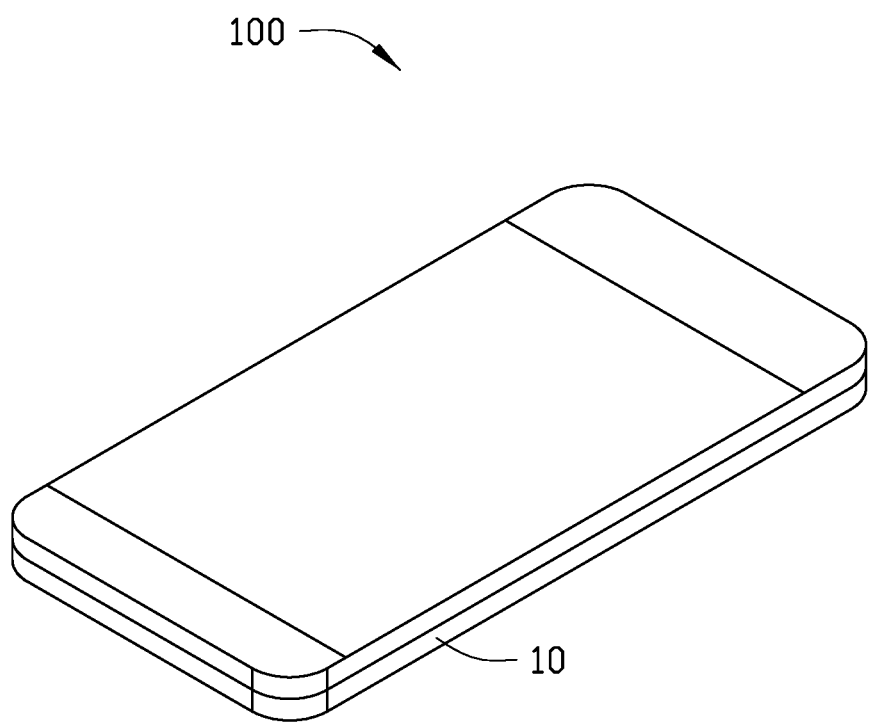
FIG. 1 is an isometric view of a communication device of a first exemplary embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

One definition that applies throughout this disclosure will now be presented.

The term "comprising," when utilized, means "including, but not necessarily limited to"; it specifically indicates open-ended inclusion or membership in the so-described combination, group, series and the like.

Figure 2:
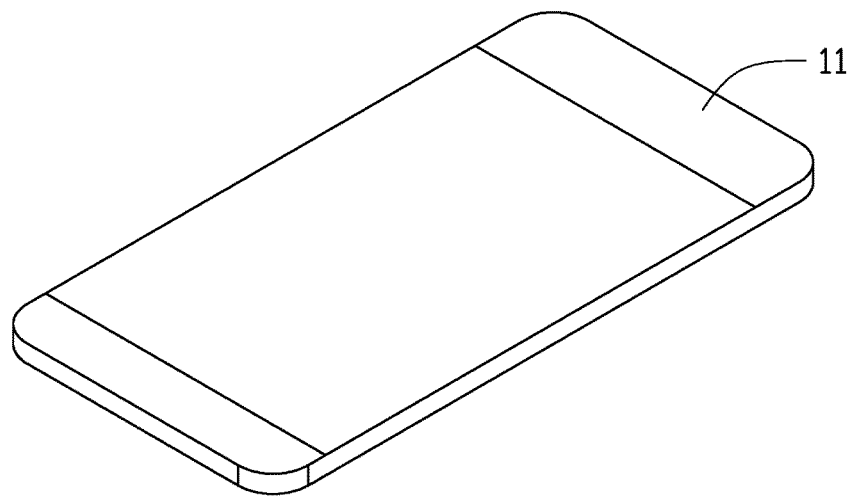
FIG. 2 is an exploded view of the communication device of FIG. 1.
Figure 2:
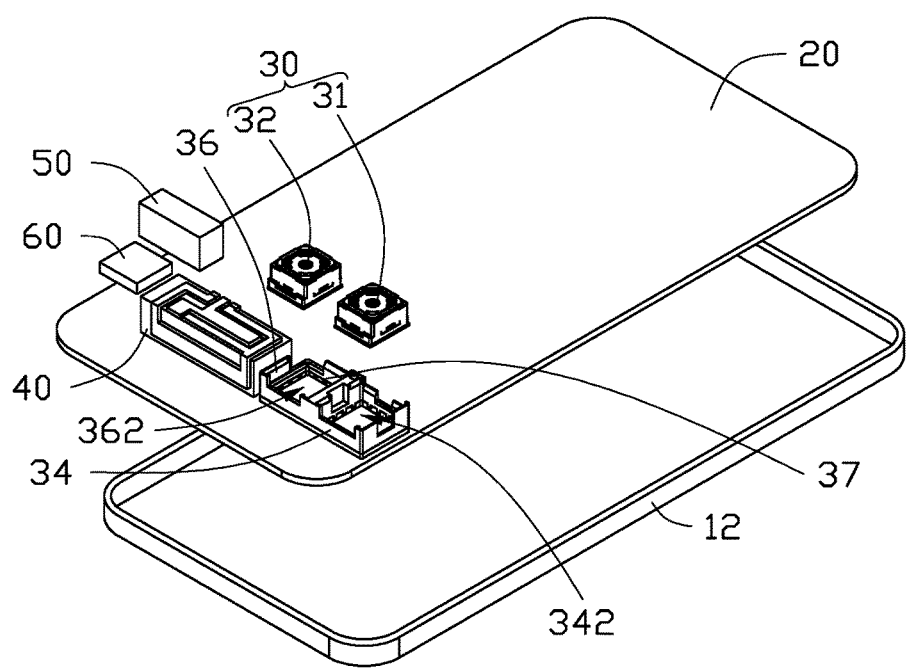
Figure 3:
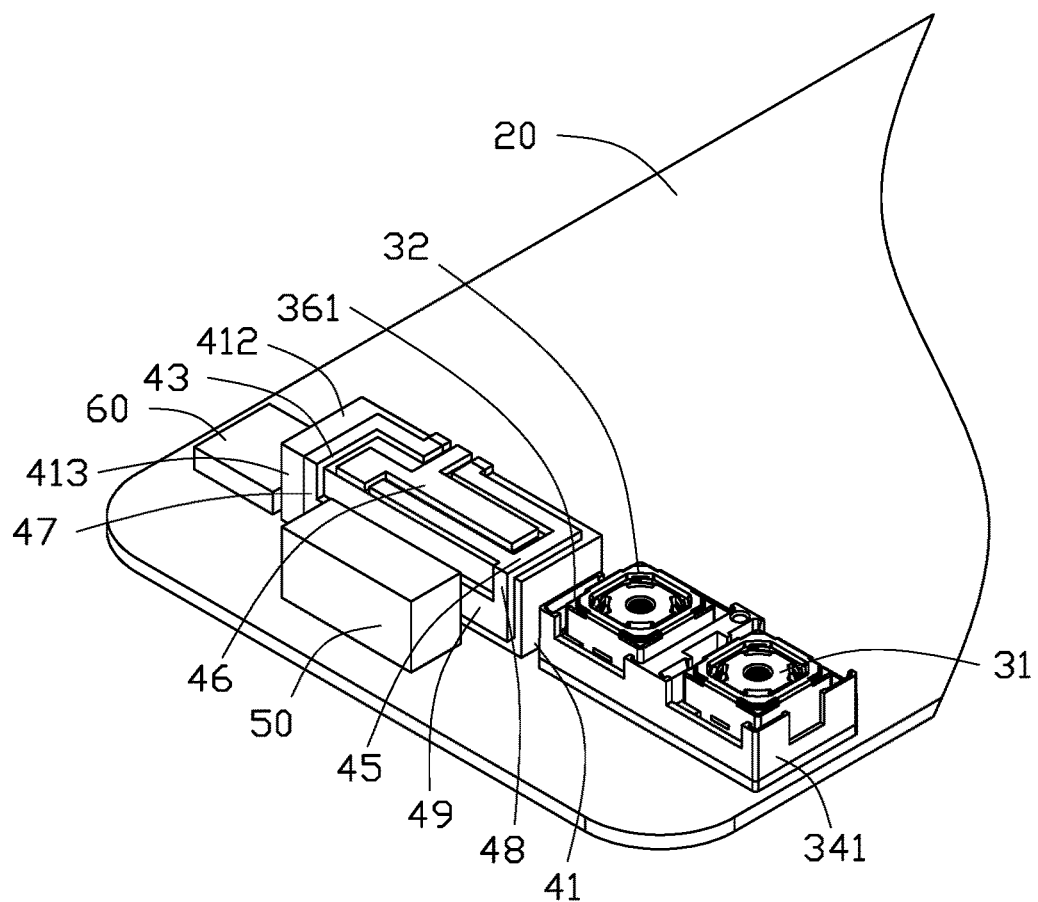
FIG. 3 is an enlarged schematic view of a part of the communication device of FIG. 2.

FIGS. 1-3 illustrate a communication device 100 of a first exemplary embodiment. The communication device 100 comprises a housing 10, a circuit board 20, a camera structure 30, an antenna structure 40, a first wireless communication device 50, and a second wireless communication device 60. The camera structure 30 may be partially exposed through the housing 10. The circuit board 20, the camera structure 30, the antenna structure 40, the first wireless communication device 50, and the second wireless communication device 60 are received in the housing 10. The camera structure 30, the antenna structure 40, the first wireless communication device 50, and the second wireless communication device 60 are secured on the circuit board 20. In the exemplary embodiment, the communication device 100 is a mobile phone. In other exemplary embodiments, the communication device 100 can be any other portable electronic device with a communication function, such as a tablet.

The housing 10 is a substantially rectangular and comprises an upper housing 11 and a lower housing 12 matching the upper housing 11. The upper housing 11 is engaged with and latched to the lower housing 12 to define an enclosed space (not shown) for receiving the circuit board 20, the camera structure 30, the antenna structure 40, the first wireless communication device 50, and the second wireless communication device 60. In the exemplary embodiment, the communication device 100 further comprises a processor, memory, battery, speaker, and other electronic components (not shown) received in the housing 10. In other exemplary embodiments, the upper housing 11 and the lower housing 12 may be fixed together by other ways such as screws.

The circuit board 20 is substantially flat and is used to exchange electrical signals with the camera structure 30, the antenna structure 40, the first wireless communication device 50, and the second wireless communication device 60.

The camera structure 30 is electrically connected to the circuit board 20. The camera structure 30 comprises a first camera 31, a second camera 32, a first frame 34, and a second frame 36.

The first camera 31 and the second camera 32 have the same orientation. The first camera 31 and the second camera 32 can switch from a picture capturing state to a video capturing state. When in the picture capturing state, the first camera 31 and the second camera 32 are configured to capture pictures. When in the video capturing state, the first camera 31 and second camera 32 are configured to capture videos. In the exemplary embodiment, the first camera 31 and second camera 32 can work together in capturing pictures in order to obtain a three-dimensional picture. The first camera 31 and second camera 32 may also be in different states, for example, the first camera 31 is in the video capturing state and the second camera 32 in the picture capturing state, or the first camera 31 is in the picture capturing state and the second camera is in the video capturing state, so that the camera structure 30 can obtain still images and videos simultaneously. In the exemplary embodiment, the first camera 31 and the second camera 32 may have different focal length adjustment ranges. In other exemplary embodiments, the first camera 31 and the second camera 32 may have the same focal length adjustment range. In other exemplary embodiments, at least the first camera 31 or the second camera 32 can be rotated relative to the circuit board 20 to adjust an angle with respect to the circuit board 20.

The first frame 34 is connected to the second frame 36, and is electrically connected to a ground region of the circuit board 20. The first frame 34 comprises four first side walls 341. The four first side walls 341 are connected end-to-end to define a first cavity 342 for receiving the first camera 31. The second frame 36 comprises four second side walls 361. The four second side walls 361 are connected end-to-end to define a second cavity 362 for receiving the second camera 32. One of the first side walls 341 of the first frame 34 and one of second side walls 361 of the second frame 36 are common to the first frame 34 and the second frame 36. In the exemplary embodiment, the first frame 34 and second frame 36 are integrally formed with each other, and are made of a metal material. In the exemplary embodiment, one or more projections 37 arranged side by side are positioned on inner surfaces of each first side wall 341 and each second side wall 361. The projection 37 can latch to the first camera 31 and the second camera 32 to fix the first camera 31 in the first cavity 342 and the second camera 32 in the second cavity 362. In the exemplary embodiment, the inner surfaces of the first side walls 341 and the second side walls 361 are connected surfaces resembling a staircase to respectively support the first camera 31 in the first cavity 342 and the second camera 32 in the second cavity 362.

The antenna structure 40 is electrically connected to the second frame 36. The antenna structure 40 includes a support portion 41, a first antenna 43, a second antenna 45, a third antenna 46, a first extending portion 47, a second extending portion 48, and a third extending portion 49. The support portion 41 comprises an upper surface 412 and a first side 413. The first side 413 is perpendicular to the second frame 36, and the first side 413 is perpendicular to the circuit board 20. The first antenna 43, the second antenna 45, and the third antenna 46 are received in the support portion 41 and positioned on the upper surface 412. The first antenna 43 and the second antenna 45 are substantially symmetrical about the third antenna 46, the third antenna 46 is positioned between the first antenna 43 and the second antenna 45. The first antenna 43 is substantially Z-shaped. The second antenna 45 is substantially U-shaped. The third antenna 46 is substantially T-shaped. The first extending portion 47 supports the first antenna 43, and the second extending portion 48 supports the second antenna 45. The third extending portion 49 is connected between the first extending portion 47 and the second extending portion 48. The first antenna 43 extends toward the opposite first sides 413 to form the first extending portion 47. The second antenna 45 extends toward opposite first sides 413 to form the second extending portion 48. At least one of the first antenna 43, the second antenna 45, the third antenna 46, the first extending portion 47, the second extending portion 48, and the third extending portion 49 is electrically connected to the second frame 36. In the exemplary embodiment, the support portion 41 is made of plastic material. The first antenna 43, the second antenna 45, the third antenna 46, the first extending portion 47, the second extending portion 48, and the third extending portion 49 are made of metal material. In other exemplary embodiments, the antenna structure 40 may be directly and electrically connected to the circuit board 20.

Both the first wireless communication device 50 and the second wireless communication device 60 are adjacent to the antenna structure 40. The first wireless communication device 50 and the second wireless communication device 60 are positioned at two different sides of the support portions 41. The first wireless communication device 50 and the second wireless communication device 60 together can communicate wirelessly with other wireless communication devices 100. In the exemplary embodiment, the first wireless communication device 50 may be a WIFI wireless device, the second wireless communication device 60 may be a 4G wireless device. In the exemplary embodiment, the first wireless communication device 50 is positioned on the side of the antenna structure 40, the first wireless communication device 50 is close to the second frame 36, so the camera structure 30, the antenna structure 40, and the first wireless communication device 50 cooperatively form a group of devices having an overall shape of an "L". The second wireless communication device 60 is positioned at one side of the antenna structure 40 away from the second frame 36.

Figure 4:
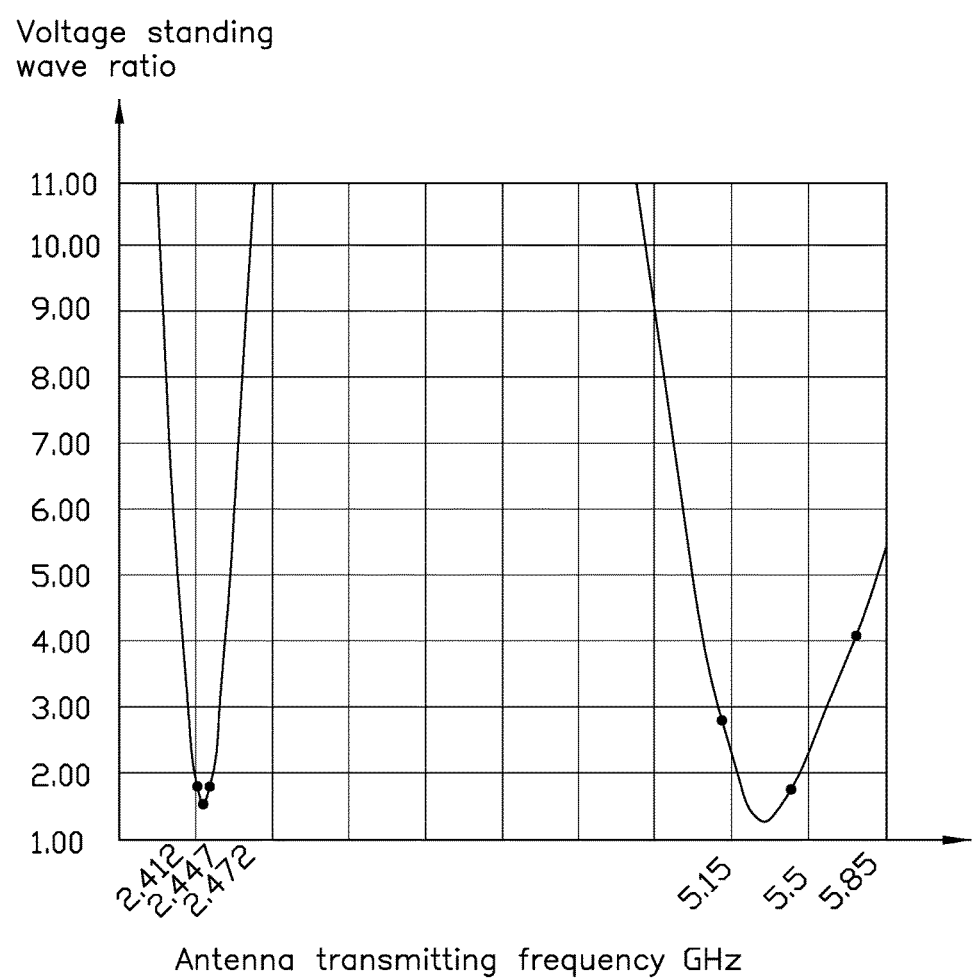
FIG. 4 is an oscillogram of voltage standing wave ratios of the communication device of FIG. 1.

FIG. 4 illustrates an oscillogram showing a relationship between antenna transmitting frequencies and voltage standing wave ratios of the communication device 100 when the camera structure 30, the antenna structure 40, and the first wireless communication device 50 are in the shape of an "L". When the antenna transmitting frequency is 0.791 GHz, the voltage standing wave ratio is 2.3721; when the antenna transmitting frequency is 0.894 GHz, the voltage standing wave ratio is 13.984; when the antenna transmitting frequency is 1.805 GHz, the voltage standing wave ratio is 2.2104; when the antenna transmitting frequency is 2.17 GHz, the voltage standing wave ratio is 2.5035; when the antenna transmitting frequency is 2.4 GHz, the voltage standing wave ratio is 1.448; when the antenna transmitting frequency is 2.5 GHz, the voltage standing wave ratio is 1.8047; when the antenna transmitting frequency is 2.69 GHz, the voltage standing wave ratio is 2.1115; when the antenna transmitting frequency is 5.15 GHz, the voltage standing wave ratio is 1.7728; when the antenna transmitting frequency is 5.85 GHz, the voltage standing wave ratio is 3.4431.

Table 1-1 illustrates a relation between antenna transmitting frequencies and their respective transmitting powers of the communication device 100.

TABLE 1-1

| Frequency (MHz) | Transmitting power (dBm) |
| --- | --- |
| 2412 | −3.59 |
| 2447 | −4.06 |
| 2472 | −4.71 |
| 5150 | −1.76 |
| 5500 | −1.47 |
| 5850 | −2.27 |
| LTE B1 | −5.78 |
| LTE B3 | −3.52 |
| LTE B7 | −5.03 |
| LTE B8 | −8.6 |
| LTE B12 | −5.78 |
| LTE B13 | −8.6 |
| LTE B17 | −8.37 |
| LTE B20 | −3.8 |
| LTE B28 | −5.48 |

It is well-known that each of LTE B1, LTE B3, LTE B7, LTE B8, LTE B12, LTE B13, LTE B17, LTE B20 and LTE B28 corresponds to a preset range of antenna transmitting frequencies. Thus, the radiation efficiency of the antenna structure 40 is improved by positioning the antenna structure 40 adjacent to the second frame 36, electrically connecting the antenna structure to the second frame 36, and electrically connecting the ground region of the circuit board 20 to the second frame 36. Since the camera structure 30 and the antenna structure 40 are positioned on the same circuit board 20, there is no need to provide two or more circuit board to carry the camera structure 30 and the antenna structure 40, integration of the communication device 100 is improved.

Figure 5:
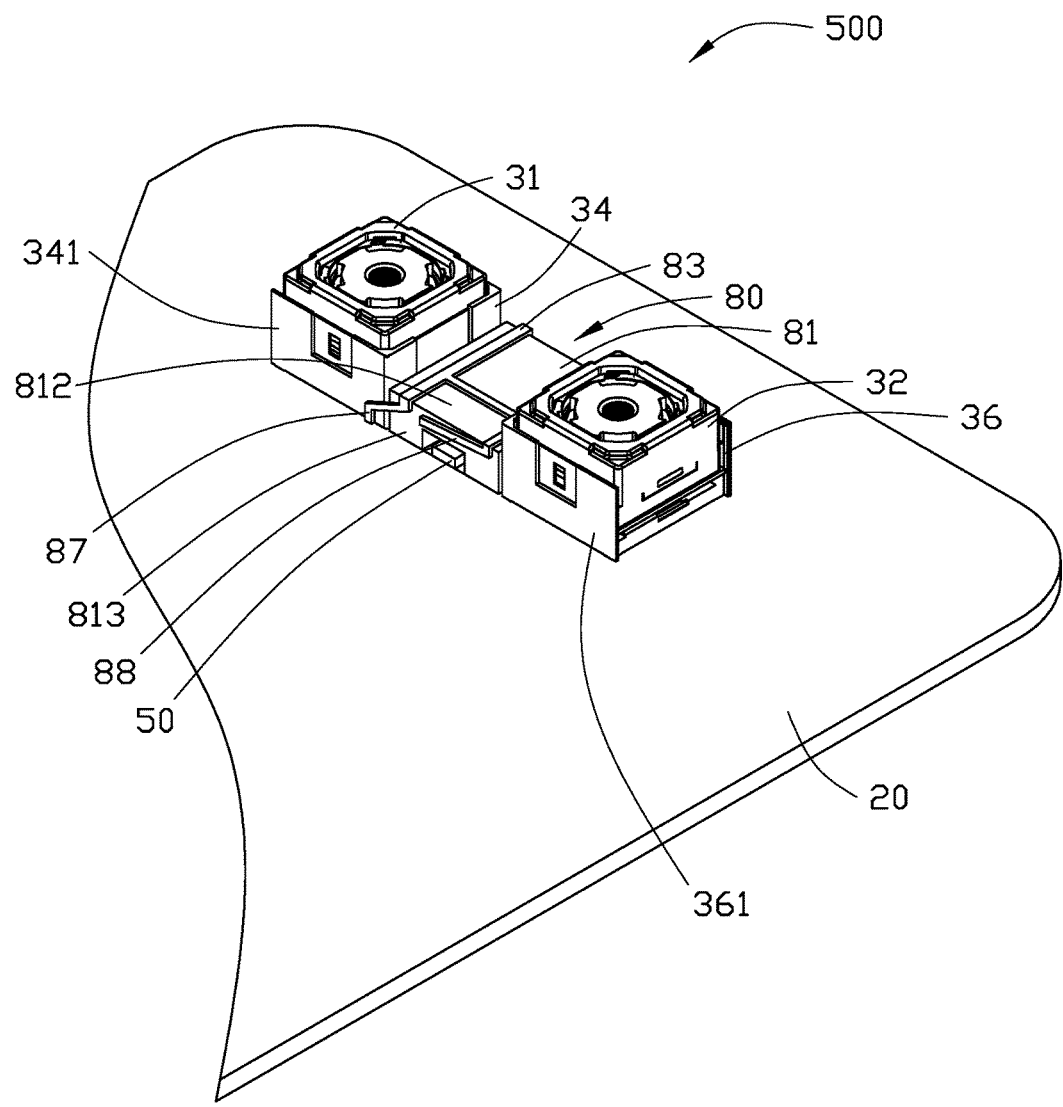
FIG. 5 is similar to FIG. 3, but showing a second exemplary embodiment of a communication device.

FIG. 5 illustrates a communication device 500 of second exemplary embodiment. Communication device 500 is different from communication device 100 in that the first frame 34 and the second frame 36 do not share a common side wall, and the first frame 34 is spaced apart from the second frame 36 through the antenna structure 80.

In the communication device 500, the antenna structure 80 is positioned between the first frame 34 and the second frame 36. The antenna structure 80 includes a support portion 81, a first antenna 83, a first extending portion 87, and a second extending portion 88. The support portion 81 is positioned on the circuit board 20. The support portion 81 comprises an upper surface 812 and a first side 813. The upper surface 812 is positioned opposite to the circuit board 20. The first side 813 is perpendicular to the first frame 34 and the second frame 36, and the first side 813 is perpendicular to the circuit board 20. The first antenna 83 is positioned on the upper surface 812. The first antenna 83 is H-shaped. The first extending portion 87 and the second extending portion 88 are positioned on the first side 813. The first extending portion 87 is adjacent to the first frame 34, and the first extending portion 87 extends to the second side wall 361. The second side wall 361 is parallel to the first frame 34 and the first side 813. The first extending portion 87 is connected to ground by the first frame 34 to reduce the electrical influence of the first frame 34 on the antenna structure 80. The second frame 36 extends towards the first frame 34 to form the second extending portion 88. In the exemplary embodiment, the support portion 81 is made of plastic material; the first antenna 83, the first extending portion 87, and the second extending portion 88 are made of metal material. In other exemplary embodiments, the shapes of the first antenna 83, the first extending portion 87, and the second extending portion 88 may be different. For example, the first antenna 83, the first extending portion 87, and the second extending portion 88 together may be arranged in a shape of a paper-clip or "Z".

The first wireless communication device 50 is positioned on the circuit board 20. The first wireless communication device 50 is positioned between the first frame 34 and the second frame 36. The support portion 81 is positioned above the first wireless communication device 50. The first wireless communication device 50 can communicate with other wireless communication devices 500. In the exemplary embodiment, the first wireless communication device 50 may be a WIFI wireless device.

Figure 6:
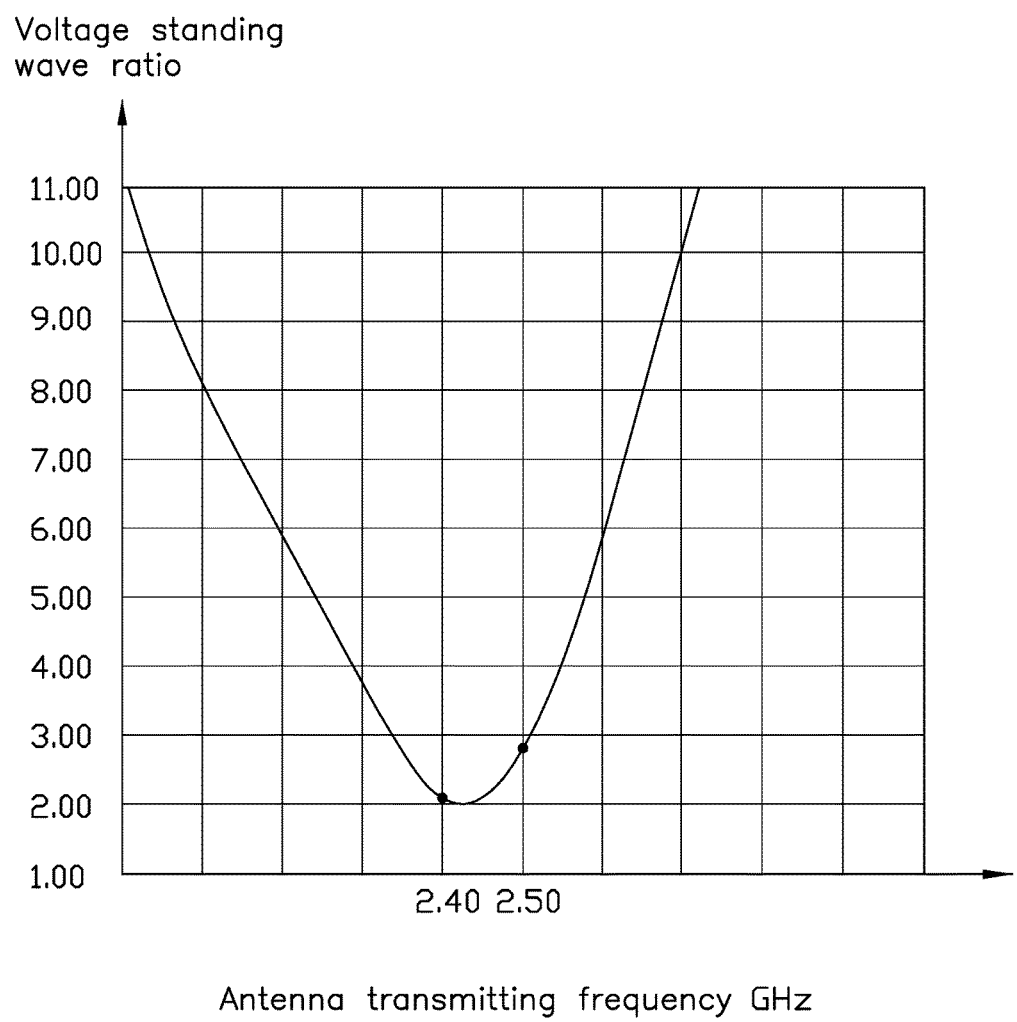
FIG. 6 is an oscillogram of voltage standing wave ratios of the communication device of FIG. 5.

FIG. 6 illustrates an oscillogram showing a relationship between antenna transmitting frequencies and voltage standing wave ratios of the communication device 500, in which the antenna structure 80 is positioned between the first frame 34 and the second frame 36. When the antenna transmitting frequency is 2.4 GHz, the voltage standing wave ratio is 2.1032; when the antenna transmitting frequency is 2.5 GHz, the voltage standing wave ratio is 2.8432.

Table 1-2 illustrates a relation between antenna transmitting frequencies and their respective transmitting powers of the communication device 500.

TABLE 1-2

| Frequency (MHz) | Transmitting power (dBm) |
|---|---|
| 2402 | −4.5 |
| 2442 | −4.0 |
| 2482 | −4.2 |

Thus, the radiation efficiency of the antenna structure 80 is improved by positioning the antenna structure 80 adjacent to first frame 34, and electrically connecting the antenna structure 80 to the first frame 34. The ground region of the circuit board 20 is electrically connected to the second frame 36. Since the camera structure 30 and the antenna structure 80 are positioned on the same circuit board 20, there is no need to provide two or more circuit board to carry the camera structure 30 and the antenna structure 80, integration of the communication device 500 is improved.

Figure 7:
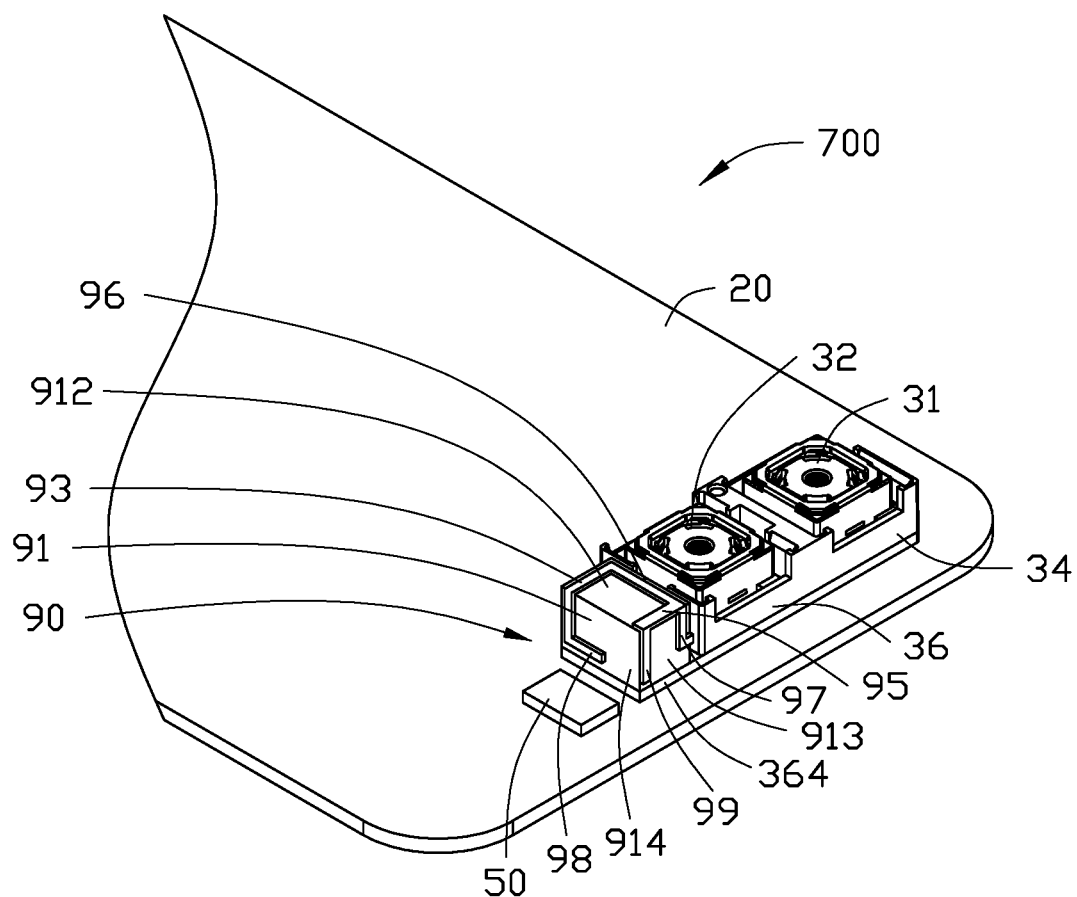
FIG. 7 is similar to FIGS. 3 and 5, but showing a third exemplary embodiment of a communication device.

FIG. 7 illustrates a communication device 700 of third exemplary embodiment. Communication device 700 is different from communication devices 100 and 500 in that the second frame 36 comprises a carrier plate 364 that extends toward the second frame 36, and the carrier plate 364 is electrically connected to the second frame 36.

The antenna structure 90 includes a support portion 91, a first antenna 93, a second antenna 95, a third antenna 96, a first extending portion 97, a second extending portion 98, and a third extending portion 99. The support portion 91 comprises an upper surface 912, a first side 913, and a second side 914. The upper surface 912 is positioned opposite to the circuit board 20. The first side 913 is perpendicularly connected to the circuit board 20. The first antenna 93, the second antenna 95, and the third antenna 96 are positioned on the upper surface 912. The first antenna 93 and the second antenna 95 are positioned substantially symmetrically about the third antenna 96. The third antenna 96 is positioned between the first antenna 93 and the second antenna 95. The first antenna 93 extends toward the first side 913 to form the first extending portion 97. The first extending portion 97 is positioned adjacent to the second frame 36. The first extending portion 97 is substantially L-shaped. The second antenna 95 extends toward the second side 914 to form the second extending portion 97 and the third extending portion 99. The second extending portion 98 is positioned adjacent to the second frame 36. The third extending portion 99 is positioned away from the second frame 36. The second extending portion 98 is substantially L-shaped. The third section 99 is substantially rectangular and is electrically connected to the carrier plate 364. In the exemplary embodiment, the support portion 91 is made of plastic material. The first antenna 93, the second antenna 95, the third antenna 96, the first extending portion 97, the second extending portion 98, and the third extending portion 99 are made of metal material.

The first wireless communication device 50 is positioned on the circuit board 20 and is adjacent to the antenna structure 90. In the exemplary embodiment, the camera structure 30, the antenna structure 90, and the first wireless communication module 50 are positioned in a row. The first wireless communication device 50 can communicate with other wireless communication devices 700. In the exemplary embodiment, the first wireless communication device 50 may be a WIFI wireless device. The first wireless communication device 50 is electrically connected to the antenna structure 90 through a coaxial cable (not shown).

Figure 8:
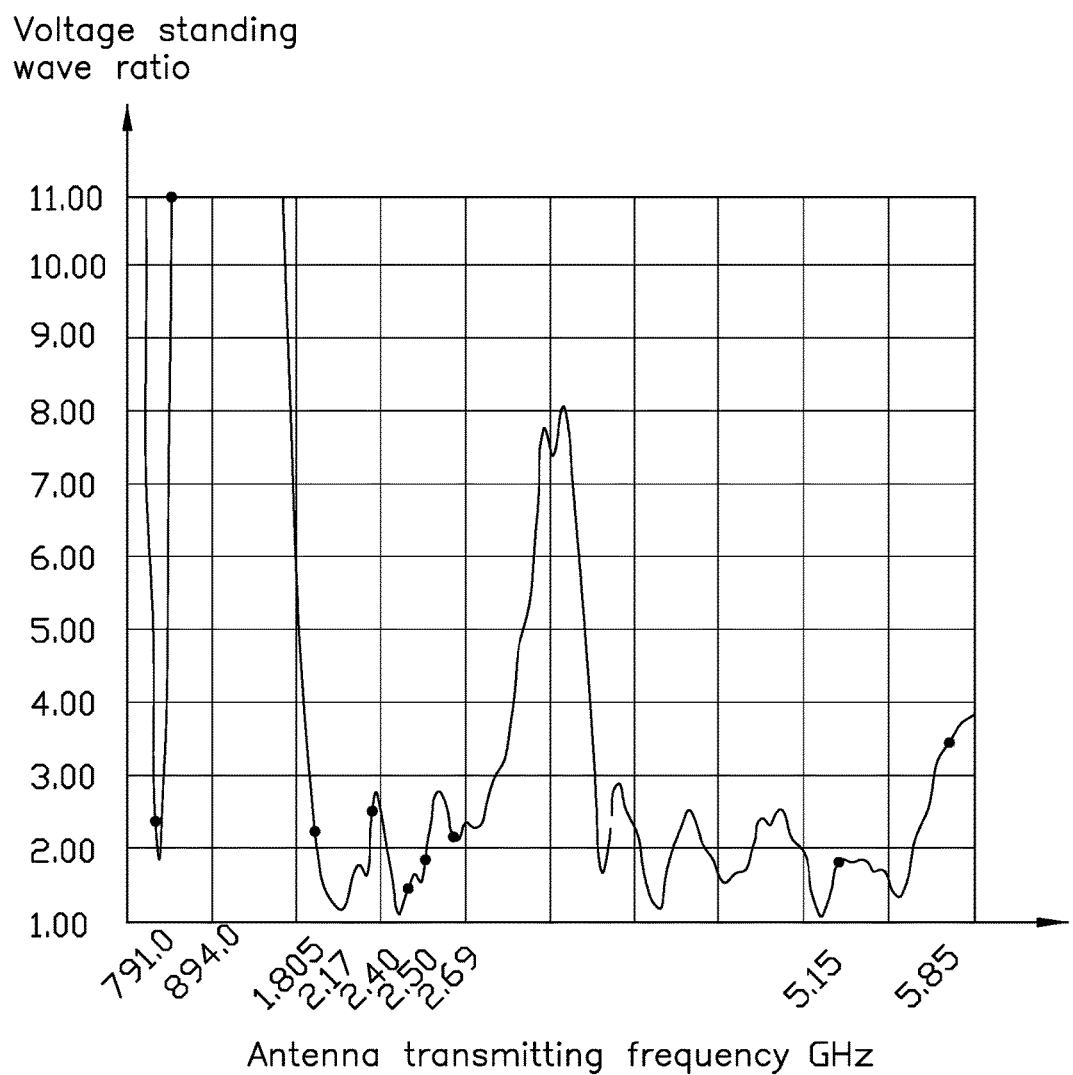
FIG. 8 is an oscillogram of voltage standing wave ratios of the communication device of FIG. 7.

FIG. 8 illustrates an oscillogram showing a relationship between antenna transmitting frequencies and voltage standing wave ratios when the camera structure 30, the antenna structure 90, and the first wireless communication device 50 are positioned in a row, as they are in the communication device 700. Wherein the antenna transmitting frequency is 2.412 GHz, the voltage standing wave ratio is 1.8310; when the antenna transmitting frequency is 2.472 GHz, the voltage standing wave ratio is 1.815; when the antenna transmitting frequency is 5.15 GHz, the voltage standing wave ratio is 2.7828; when the antenna transmitting frequency is 5.5 GHz, the voltage standing wave ratio is 1.7987; when the antenna transmitting frequency is 5.85 GHz, the voltage standing wave ratio is 4.1434.

Table 1-3 illustrates a relation between antenna transmitting frequencies and their respective transmitting powers of the communication device 700.

TABLE 1-3

| Frequency (MHz) | Transmitting power (dBm) |
|---|---|
| 2412 | −4.85 |
| 2447 | −4.34 |
| 2472 | −4.61 |
| 5150 | −2.36 |
| 5500 | −2.08 |
| 5850 | −3.77 |

Thus, the radiation efficiency of the antenna structure 90 is improved by positioning the antenna structure 90 adjacent to second frame 36 and electrically connecting the antenna structure 90 to the second frame 36. The ground region of the circuit board 20 is connected to the second frame 36. Since the camera structure 30 and the antenna structure 90 are positioned on the same circuit board 20, there is no need to provide two or more circuit board to carry the camera structure 30 and the antenna structure 90, integration of the communication device 700 is improved.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. A communication device comprising:
a housing;
a circuit board received in the housing;
a camera structure partially exposed through the housing, the camera structure comprising a first camera, a second camera, a first frame configured to received the first camera, and a second frame configured to received the second camera, the first camera and the second camera having a same orientation; and
an antenna structure;
wherein the camera structure and the antenna structure are positioned on the circuit board, the antenna structure is positioned adjacent to and electrically connected to at least one of the first frame and the second frame.

2. The communication device of claim 1, wherein the first frame and second frame are integrally formed, the antenna structure is positioned adjacent to the second frame, and is connected electrically to the second frame.

3. The communication device of claim 2, wherein the second frame comprises a carrier plate; and wherein the carrier plate is parallel to the circuit board; the carrier plate is configured for carrying the antenna structure and is electrically connected to the antenna structure; and the antenna structure is adjacent to the second frame.

4. The communication device of claim 2, wherein the communication device further comprises a first wireless communication device, the antenna structure is positioned between the second frame and the first wireless communication device, and wherein the antenna structure and the first wireless communication device are connected.

5. The communication device of claim 2, wherein the antenna structure comprises a support portion, a first antenna, a second antenna, a third antenna, a first extending portion, and a second extending portion; wherein the support portion comprises an upper surface, a first side, and a second side, the upper surface is positioned away from the circuit board, the first side is perpendicularly connected to the circuit board; wherein the first antenna, the second antenna, and the third antenna are positioned on the upper surface, the first antenna and the second antenna are positioned at opposite ends of the upper surface, the third antenna is positioned between the first antenna and the second antenna, the first antenna extends toward the first side to form the first extending portion, the first extending portion is positioned adjacent to the second frame, and the second antenna extends toward the second side to form the second extending portion.

6. The communication device of claim 2, wherein the communication device comprises a first wireless communication device, the second frame, and the antenna structure, and wherein the communication device is substantially L-shaped.

7. The communication device of claim 4, wherein the first extending portion is electrically connected to the second frame, the antenna structure comprises a support portion, a first antenna, a second antenna, a third antenna, a first extending portion, a second extending portion, and a third extending portion, the support portion comprises an upper surface and a first side, the upper surface is positioned opposite to circuit board, the first side is perpendicular to the second frame, and is perpendicular connected to the circuit board, the first antenna, the second antenna and the third antenna are received in the support portion and aligned with the upper surface, the first antenna and the second antenna are positioned symmetrically relative to each other, the third antenna is positioned between the first antenna and the second antenna, the first extending portion, the second extending portion, and the third extending portion are positioned on the upper surface, the first extending portion and the second extending portion are symmetrically positioned, the third extending portion is connected between the first extending portion and second extending portion, the first antenna extends toward the first side to form the first extending portion, the second antenna extends toward the first side to form the second extending portion.

8. The communication device of claim 5, wherein the communication device further comprising a second wireless communication device, the antenna structure is positioned between the second frame and the second wireless communication device.

9. The communication device of claim 1, wherein the first frame and the second frame are spaced apart from each other, the antenna structure is positioned between the first frame and second frame; the antenna structure is electrically connected to the first frame.

10. The communication device of claim 9 further comprising a first wireless communication device, wherein the first wireless communication device is positioned between the first frame and the second frame, and is positioned below the antenna structure.

11. The communication device of claim 10, wherein the antenna structure comprises a support portion, a first antenna, and a first extending portion, the support portion is positioned on the first wireless device, the support portion comprises an upper surface and a first side, the upper surface is positioned away from circuit board, the first side is perpendicular to the first frame and the second frame, and the first side is perpendicularly connected to the circuit board, the first antenna is positioned on the upper surface, the first extending portion is positioned adjacent to the first frame, and wherein the first extending portion extends a side wall, the side wall is paralleled to the first frame and the first side, and the first extending portion is connected to the ground by the first frame.

12. The communication device of claim 1, wherein the first frame comprises four first side walls, the four first side walls are connected end-to-end to define a first cavity for receiving the first camera, the second frame comprises four second side walls, the four second side walls are connected end-to-end to define a second cavity for receiving the second camera, the first frame and the second frame each comprise one or more projections, one or more projections arranged side by side are positioned on an inner surface of at least one of the first side walls and at least one of the second side walls.

13. The communication device of claim 12, wherein the inner surfaces of at least one of the first side walls and at least one of second side walls are connected surfaces resembling a staircase to respectively support the first camera in the first cavity and the second camera in the second cavity.

14. The communication device of claim 1, wherein the first camera and second camera can switch from a picture capturing state to a video capturing state, the first camera and second camera are able to simultaneously capture pictures to obtain a three-dimensional picture.

15. The communication device of claim 14, wherein when one of the first camera and the second camera is in the video capturing state, and the other of the first camera and the second camera is in the picture capturing state, the camera structure provides videos and pictures simultaneously.

16. The communication device of claim 1, wherein the first camera and second camera have different focus length adjustment ranges.

17. The communication device of claim 1, wherein at least one of the first camera and the second camera is rotated relatively to the circuit board to adjust an angle with respect to the circuit board.

* * * * *